United States Patent [19]
Monzaki et al.

[11] Patent Number: 5,704,695
[45] Date of Patent: Jan. 6, 1998

[54] DRIFT-OUT SUPPRESS CONTROL DEVICE OF VEHICLE IMPROVED FOR TERMINATION OF CONTROL

[75] Inventors: Shirou Monzaki, Mishima; Mizuho Sugiyama, Toyota, both of Japan

[73] Assignee: Toyota Jidosha Kabushiki Kaisha, Toyota, Japan

[21] Appl. No.: 723,756

[22] Filed: Sep. 30, 1996

[30] Foreign Application Priority Data

Oct. 18, 1995 [JP] Japan ................. 7-294755

[51] Int. Cl.$^6$ ................. B60T 8/24; B60T 8/58
[52] U.S. Cl. ................. 303/146; 364/426.016
[58] Field of Search ................. 303/140, 146–148, 303/157, 169, DIG. 6; 364/426.016

[56] References Cited

U.S. PATENT DOCUMENTS

| | | | |
|---|---|---|---|
| 5,134,352 | 7/1992 | Matsumoto et al. | 303/146 X |
| 5,188,434 | 2/1993 | Ruf et al. | 303/146 |
| 5,251,137 | 10/1993 | Chin et al. | 303/146 X |
| 5,494,344 | 2/1996 | Heyn et al. | 303/140 |
| 5,584,541 | 12/1996 | Sone et al. | 303/146 |

FOREIGN PATENT DOCUMENTS 6-24304  2/1994  Japan.

*Primary Examiner*—Josie Ballato
*Attorney, Agent, or Firm*—Oliff & Berridge, PLC

[57] ABSTRACT

A drift-out suppress control device of a vehicle having a mechanism for estimating a liability of the vehicle body to drift out for producing a drift-out quantity which generally increases along with increase of the drift-out liability; a brake mechanism for selectively applying a variable braking force to each wheel; and a control mechanism for controlling the brake mechanism according to the drift-out quantity so as variably to apply a braking force to rear left and rear right wheels with a target value therefor for suppressing the vehicle body against drifting out, the target value being generally proportional to the drift-out quantity and being divided between the rear left and rear right wheels according to a distribution ratio, wherein the control mechanism decreases a share of the distribution ratio for one of the rear left and rear right wheels serving at the inside of a turn to be progressively lesser relative to a share of the distribution ratio for the other of the rear left and rear right wheels serving at the outside of the turn as the drift-out control approaches the end thereof.

3 Claims, 5 Drawing Sheets

DRIFT-OUT SUPPRESS CONTROL DEVICE OF VEHICLE IMPROVED FOR TERMINATION OF CONTROL

BACKGROUND OF THE INVENTION

1. Field of the Invention

The present invention relates generally to a behavior control of a vehicle such as an automobile for improving the driving stability thereof, and more particularly, to a drift-out suppress control device improved with respect to the performance at the termination of the drift-out control.

2. Description of the Prior Art

It is well know that the automobiles and the like vehicles are, when unduly driven through a curved road or a corner, liable to a "drift-out", because the side force applied to the vehicle body as a centrifugal force can increase with no limit along with increase of vehicle speed and steering angle, while the tire grip force for holding the vehicle body from the road surface is limited, particularly to be less on a slippery wet road.

Various endeavors have been made to suppress the automobiles and the like vehicles from the drifting-out. In Japanese Patent Laid-open Publication 6-24304, for example, it is described to apply a selective braking to the wheels of a vehicle such that the yaw rate of the vehicle is controlled by a feedback control method to conforms to a target yaw rate calculated based upon certain running parameters of the vehicle.

In similar endeavors for further improving the vehicle behavior particularly against the drift-out, the present inventors have noted the following:

As well known in the art, the drift-out is effectively suppressed by braking the vehicle, particularly at the rear wheels, so that the vehicle is decelerated to decrease the centrifugal force applied thereto, and further, when the rear wheels are braked, the lateral vector component of the tire grip force of the rear wheels is decreased by an addition of a longitudinal vector component generated by the braking, as the total vector of the tire grip force available is limited and saturates in all directions, thereby allowing the rear wheels to slide outside of the turn, thus forwarding the running vehicle toward inside of the turn.

In suppressing the drift-out of a vehicle by braking the rear wheels, the control is generally carried out such that a difference between an actual yaw rate detected by a yaw rate sensor and a target yaw rate calculated based upon a steering angle detected by a steering angle sensor and a vehicle speed detected by a vehicle speed sensor is calculated, then an overall slip ratio to be born by the rear wheels is determined based upon the difference between the actual yaw rate and the target yaw rate, then the overall slip ratio is divided into two slip ratios to be born by the rear wheel at the outside of the turn and the rear wheel at the inside of the turn according to a certain distribution ratio, and then braking forces to generate the respective slip ratios at the rear wheels at the outside and the inside of the turn are applied to those wheels according to the feedback control technique until the yaw rate difference disappears.

However, the present inventors have noted through various experiments that, when the distribution ratio is determined to remain constant throughout the drift-out control, it appears that, toward the end of the drift-out control, the braking force applied to the rear wheel at the inside of the turn becomes too high relative to that applied to the rear wheel at the outside of the turn, so that first an over-slip occurs at the rear wheel at the inside of the turn, which then causes an increase of the lateral load on the rear wheel at the outside to the turn, thereby finally inducing an abrupt side sliding of the rear wheels altogether. The reason for the over-braking of the rear wheel at the inside of the turn toward the end of the drift-out control is guessed due to a substantial decrease of the vertical load on the rear wheel at the inside of the turn in the final stage of drift-out control where the rear portion of the vehicle body ends the outward side slip, with the rear portion of the vehicle body being inertially applied with a relatively large rolling moment, correspondingly decreasing the vertical load on the rear wheel at the inside of the turn, thereby correspondingly decreasing the capacity of absorbing the bring force with the tire effectively gripping the road surface.

SUMMARY OF THE INVENTION

In view of the above undesirable phenomenon observed near the end of the drift-out suppress control by the technique of braking the rear wheels, it is a principal object of the present invention to provide a drift-out suppress control device of a vehicle which is more improved in the control performance at a terminal phase of control operation, so that the vehicle is more smoothly released from the drift-out control.

In order to accomplish the above-mentioned object, the present application proposes a drift-out suppress control device of a vehicle having a vehicle body, and front left, front right, rear left and rear right wheels, comprising:

a means for estimating a liability of the vehicle body to drift out for producing a drift-out quantity which generally increases along with increase of the drift-out liability;

a brake means for selectively applying a variable braking force to each of said wheels; and a control means for controlling said brake means according to said drift-out quantity so as variably to apply a braking force to said rear left and rear right wheels with a target value therefor for suppressing the vehicle body against drifting out, said target value being generally proportional to said drift-out quantity and being divided between said rear left and rear right wheels according to a distribution ratio, wherein said control means decreases a share of said distribution ratio for one of said rear left and rear right wheels serving at the inside of a turn to be progressively lesser relative to a share of said distribution ratio for the other of said rear left and rear right wheels serring at the outside of the turn as the drift-out control approaches the end thereof.

In the above-mentioned drift-out control device, said control means may include a means for detecting a peak point of increase of said drift-out quantity, and may start said progressive reduction of said share of distribution ratio for the rear wheel at the inside of the turn relative to said share of distribution ratio for the rear wheel at the outside of the turn at the detection of said peak point.

Further, in the above-mentioned drift-out control device, said control means may further include a means for taking a delay time from the detection of said peak point, and may start said progressive reduction of said share of distribution ratio for the rear wheel at the inside of the turn relative to said share of distribution ratio for the rear wheel at the outside of the turn after the lapse of said delay time from the detection of said peak point.

BRIEF DESCRIPTIONS OF THE DRAWING

In the accompanying drawing.

DESCRIPTION OF THE EMBODIMENT

In the following, the present invention will be described in more detail in the form of a preferred embodiment with reference to the accompanying drawings.

Figure 1:
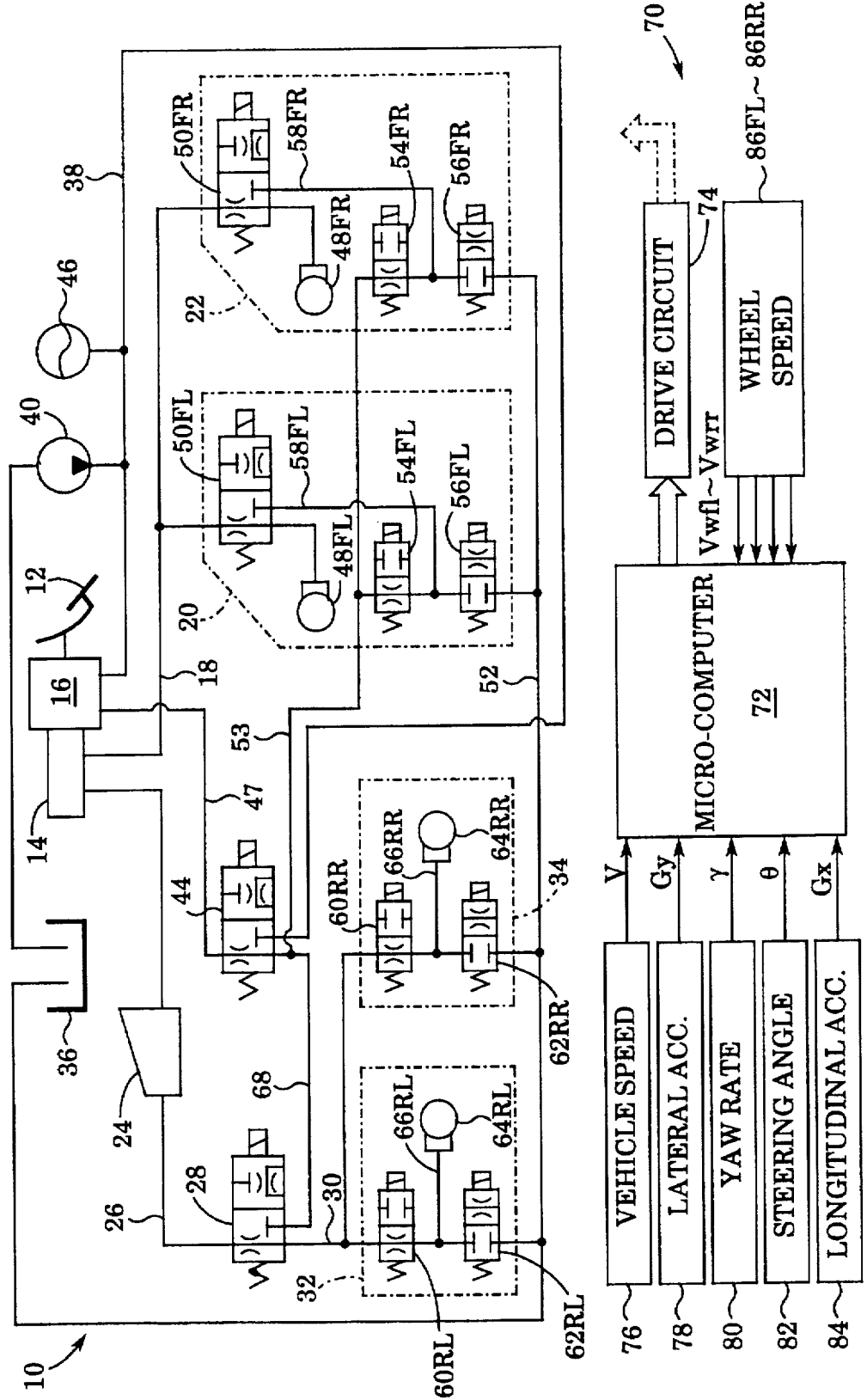
FIG. 1 is a diagrammatic illustration of hydraulic circuit means and electrical control means of an embodiment of the drift-out suppress control device according to the present invention.

First, referring to FIG. 1 showing diagrammatically an embodiment of the behavior control device of the present invention with regard to the constructions of its hydraulic circuit means and its electric control means, the hydraulic circuit means generally designated by 10 comprises a conventional manual brake pressure source means including a brake pedal 12 to be stepped on by a driver, a master cylinder 14 adapted to generate a master cylinder pressure according to the stepping-on of the brake pedal 12, and a hydro-booster 16 which generates a booster pressure.

The hydraulic means 10 further comprises a powered brake pressure source means including a reservoir 36 and a brake fluid pump 40 which delivers a pressurized brake fluid to a passage 38 to which an accumulator 46 is connected, so that a stabilized accumulator pressure for the automatic brake control described hereinbelow is available in the passage 38. The accumulator pressure is also supplied to the hydro-booster 16 as a pressure source for generating a booster pressure which has substantially the same pressure performance as the master cylinder pressure depending upon the stepping-on performance of the brake pedal 12 but is capable to maintain such a pressure performance while the brake fluid is being consumed by a series connection of a normally open type on-off valve and a normally closed type on-off valve to obtain a desired brake pressure, as described hereinbelow.

A first passage 18 extends from a first port of the master cylinder 14 to a front left wheel brake pressure control means 20 and a front right wheel brake pressure control means 22. A second passage 26, including a proportioning valve 24, extends from a second port of the master cylinder 14 toward both of a rear left wheel brake pressure control means 32 and a rear right wheel brake pressure control means 34, via a 3-ports-2-positions changeover type electromagnetic control valve 28, an outlet port of which is connected, via a common passage 30, with the rear left and right wheel brake pressure control means 32 and 34.

The brake pressure control means 20 and 22 of the front left and front right wheels include wheel cylinders 48FL and 48FR for applying variable braking forces to the front left and front right wheels, 3-ports-2positions changeover type electromagnetic control valves 50FL and 50FR, and series connections of normally open type electromagnetic on-off valves 54FL and 54FR and normally closed type electromagnetic on-off valves 56FL and 56FR, respectively, said series connections of the normally open type on-off valves and the normally closed type on-off valves being connected between a passage 53 adapted to be supplied with the accumulator pressure of the passage 38 or the booster pressure from the hydro-booster through a 3-ports-2-positions changeover type electronic control valve 44 the operation of which is described hereinbelow, and a return passage 52 connected to the reservoir 36. A mid point of the series connection of the on-off valves 54FL and 56FL is connected to a port of the control valve 50FL by a connection passage 58FL, and a mid point of the series connection of the on-off valves 54FR and 56FR is connected to a port of the control valve 50FR by a connection passage 58FR.

The brake pressure control means 32 and 34 of the rear left and rear right wheels include wheel cylinders 64RL and 64RR for applying braking force to the rear left and rear right wheels, respectively, and series connections of normally open type electromagnetic on-off valves 60RL and 60RR and normally closed type electromagnetic on-off valves 62RL and 62RR, said series connections of normally open type on-off valves and the normally closed type on-off valves being connected between the passage 30 connected to the one outlet port of the control valve 28 and the return passage 52. A mid point of the series connection of the on-off valves 60RL and 62RL is connected to a wheel cylinder 64RL for applying bring force to the rear left wheel by a connection passage 66RL, and a mid point of the series connection of the on-off valves 60RR and 62RR is connected to a wheel cylinder 64RR for applying bring force to the rear right wheel by a connection passage 66RR.

The control valves 50FL and 50FR are respectively switched over between a first position for connecting the wheel cylinders 48FL and 48FR with the manual brake pressure passage 18, while disconnecting them from the connection passages 58FL and 58FR, respectively, as in the state shown in the figure, and a second position for disconnecting the wheel cylinders 48FL and 48FR from the passage 18, while connecting them with the connection passages 58FL and 58FR, respectively.

The control valve 28 is switched over between a first position for connecting the passage 30 for both of the series connection of the on-off valves 60RL and 62RL and the series connection of the on-off valves 60RR and 62RR with the manual brake pressure passage 26 as in the state shown in the figure, and a second position for disconnecting the passage 30 from the passage 26, while connecting it with a passage 68 connected to one outlet port of the changeover control valve 44 together with the passage 53, so as to be connected with either a delivery port of the hydro-booster 16 or the accumulator pressure passage 38, according to whether the control valve 44 is in a first position such as shown in the figure or a second position opposite thereto.

When the control valves 50FL, 50FR and 28 are in the first position as in the state shown in the figure, the wheel cylinders 48FL, 48FR, 64RL, 64RR are connected with the manual brake pressure passages 18 and 26 so as to be supplied with the pressure of the master cylinder 14 to the respective wheel cylinders, thereby enabling the driver to apply a braking force to each wheel according to the stepping-on of the brake pedal 12. When the control valve 28 is changed over to the second position, with the control valve 44 being kept at the shown first position, the rear wheel cylinders 64RL and 64RR are supplied with the booster pressure according to the stepping-on of the brake pedal from the hydro-booster 16. When the control valves 50FL, 50FR, 28 and 44 are changed over to the second position, the wheel cylinders 48FL, 48FR, 64RL, 64RR are supplied with the powered accumulator brake pressure of the passage 38 under the control of the normally open on-off valves 54FL, 54FR, 60RL, 60RR and the normally closed type on-off valves 56FL, 56FR, 62RL, 62RR according to the ratio of the open state of the corresponding normally open type on-off valve and the closed state of the corresponding normally closed type on-off valve, i.e. the so-called duty ratio, apart from the stepping-on of the brake pedal 12.

The changeover control valves 50FL, 50FR, 28, 44, normally open type on-off valves 54FL, 54FR, 60RL, 60RR, normally closed type on-off valves 56FL, 56FR, 62RL, 62RR and the pump 40 are all controlled by an electric control means 70 as described in detail hereinbelow. The electric control means 70 consists of a micro-computer 72 and a driving circuit means 74. Although not shown in detail in FIG. 1, the micro-computer 72 may have a general construction including a central processing unit, a read only memory, a random access memory, input and output port means and a common bus interconnecting these functional elements.

The input port means of the micro-computer 72 is supplied with a signal showing vehicle speed V from a vehicle speed sensor 76, a signal showing lateral acceleration Gy of the vehicle body from a lateral acceleration sensor 78 mounted substantially at a mass center of the vehicle body, a signal showing yaw rate γ of the vehicle body from a yaw rate sensor 80, a signal showing steering angle θ from a steering angle sensor 82, a signal showing longitudinal acceleration Gx of the vehicle body from a longitudinal acceleration sensor 84 mounted substantially at the mass center of the vehicle body, and signals showing wheel speed (wheel circumferential speed) Vwfl, Vwfr, Vwrl, Vwrr of front left and right wheels and rear left and right wheels not shown in the figure from wheel speed sensors 86FL–86RR, respectively. The lateral acceleration sensor 78, yaw rate sensor 80 and steering angle sensor 82 detect the lateral acceleration; yaw rate and steering angle, respectively, as being positive when the vehicle makes a left turn, and the longitudinal acceleration sensor 84 detects longitudinal acceleration as being positive when the vehicle is accelerated in the forward direction. In general, in the following analyses, the parameters which are distinctive of the direction of turn of the vehicles are each assumed to be positive when the turn is counter-clockwise and negative when the turn is clockwise, as viewed from the top of the vehicle.

Figure 2:
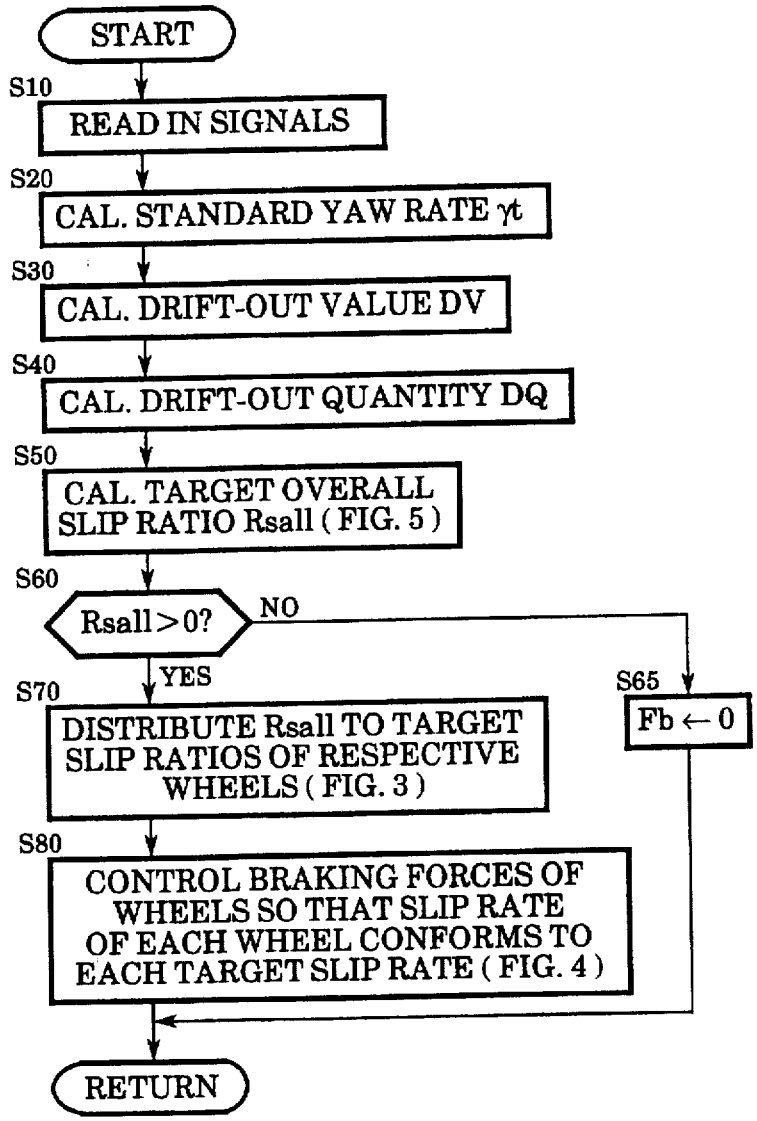
FIG. 2 is a flowchart showing an embodiment of the drift-out suppress control routine conducted by the device of the present invention.
Figure 5:
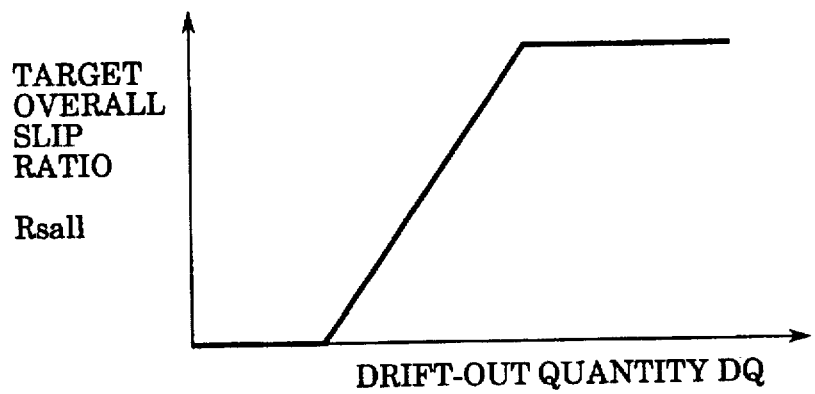
FIG. 5 is a map showing the relationship between the drift-out quantity DQ and the target overall slip ratio Rsall.
Figure 3:
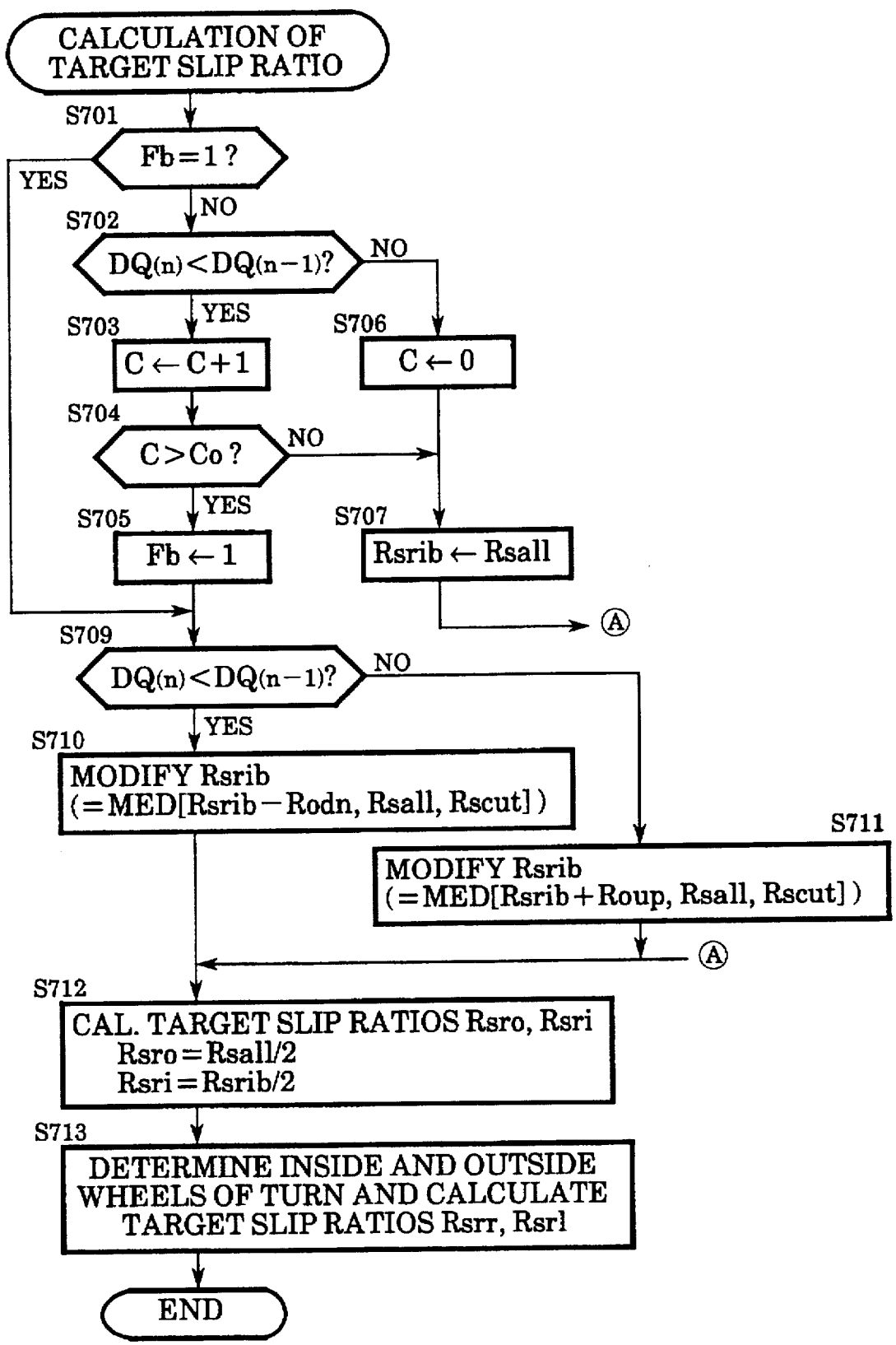
FIG. 3 is a flowchart showing a target slip ratio calculation step included in the routine of FIG. 2 in more detail.
Figure 4:
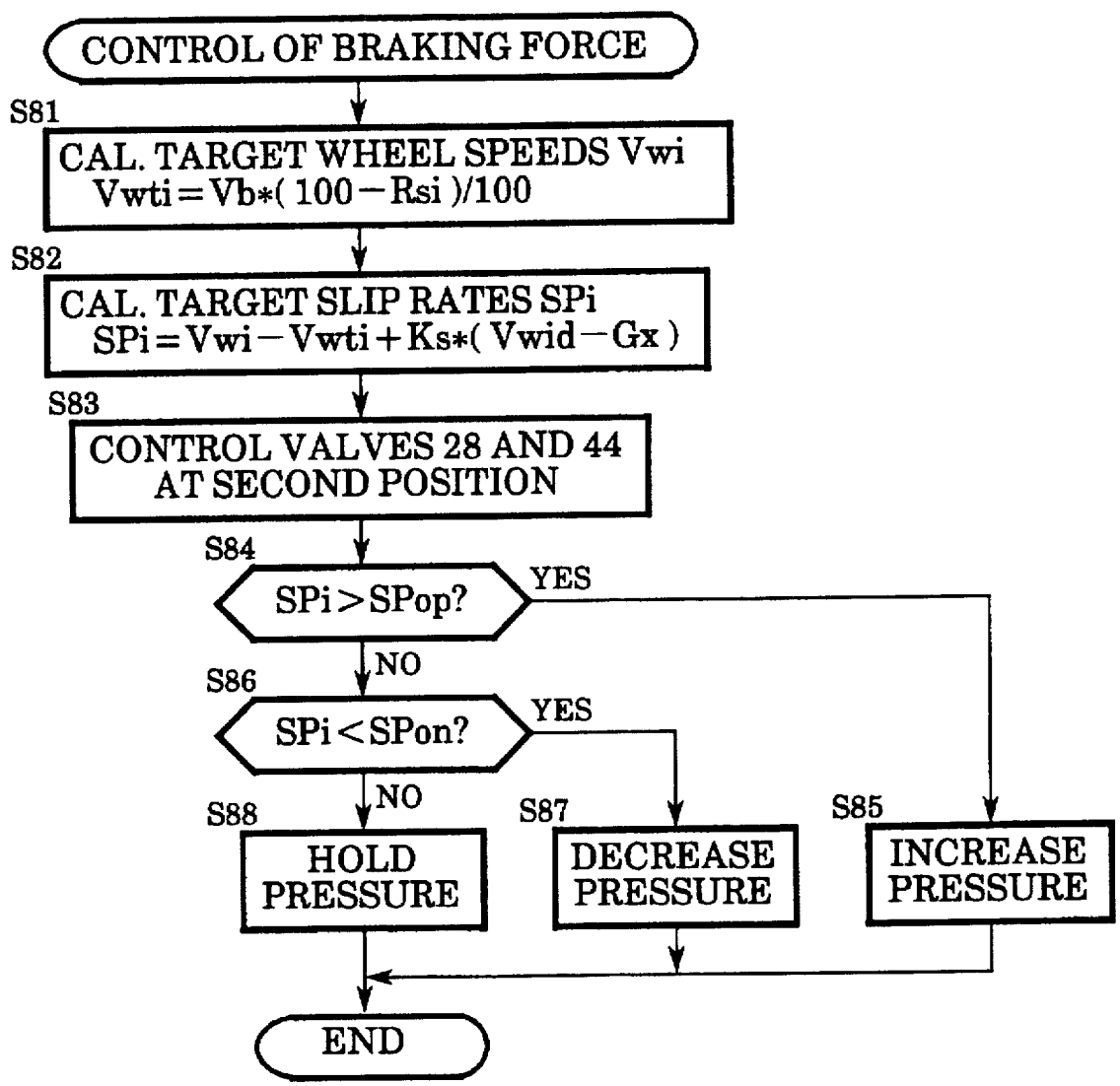
FIG. 4 is a flowchart showing a braking force control step included in the routine of FIG. 2 in more detail.

The read only memory of the micro-computer 72 stores such flowcharts as shown in FIGS. 2, 3 and 4 and such a map as shown in FIG. 5. The central processing unit conducts calculations based upon the parameters detected by the above-mentioned various sensors according to those flowcharts and maps as described hereinbelow, so as to obtain the spin quantity and the drift-out quantity for judging and estimating spinning state and drifting out state of the vehicle, respectively, and controls the turn behavior of the vehicle based upon the estimated quantities, particularly to suppress the vehicle against spinning and drifting out, by selectively applying a variable bring force to each of the wheels.

In the following, the drift-out suppress control device of the present invention will be described in the form of an embodiment of its control operation with reference to FIGS. 2–6. The control according to the flowcharts of FIG. 2 is started by a closure of an ignition switch not shown in the figure and carried out repetitively at a predetermined time interval such as tens of micro-seconds.

In step 10, the signals including vehicle speed V from the vehicle speed sensor 76 and others are read in. In step 20, a target yaw rate γ is calculated according to the following formula 1, wherein H is the wheel base and Kh is an appropriate stability factor:

$$\gamma c = V * \theta / (1 + Kh * V^2) * H \tag{1}$$

The calculation of the target yaw rate γc may be modified to incorporate the lateral acceleration Gy of the vehicle body. Then, by employing the Laplace operator s and an appropriate time constant T therefor, a standard yaw rate γt is calculated according to the following formula 2:

$$\gamma t = \gamma c / (1 + T * s) \tag{2}$$

In step 30, a value herein called drift-out value DV is calculated according to the following formula 3 or 4, the latter being modified by the ratio of wheel base H to vehicle speed V:

$$DV = (\gamma t - \gamma) \tag{3}$$

$$DV = H * (\gamma t - \gamma) / V \tag{4}$$

In step 40, based upon the judgment of the direction of turn of the vehicle based upon the sign of the yaw rate γ, a parameter herein called drift-out quantity DQ is determined such that DQ=DV when the vehicle is making a left turn, while DQ=–DV when the vehicle is making a right turn. As will be appreciated, the drift-out quantity DQ is a parameter which shows the liability of the vehicle body to drift out. Then, referring to a map such as shown in FIG. 5, a target overall slip ratio Rsall is read out to correspond to the current value of the drift-out quantity DQ.

In step 60, it is judge if the target overall slip ratio Rsall is positive or not, i.e. if the drift-out quantity DQ is greater than a threshold value appropriately determined therefor. When the answer is no, the control returns to step 10 through step 65 for resetting a below-mentioned flag Fb to zero, as there is no need to execute the drift-out control in such a driving condition, whereas when the answer is yes, the control proceeds to step 70, where a series of control processes are carried out as shown in the flowchart of FIG. 3.

Referring to FIG. 3, when the drift-out control was once substantially started, i.e. when the control has proceeded from step 60 to step 70, every time of the scanning cycle of the control routine it is first checked through steps 701–705 if the drift-out control has passes a peak point of the control. So in step 701, it is checked if flag Fb is 1. Initially, Fb is 0, so the control proceeds to step 702. In step 702, it is judged if the value of DQ at the current scanning cycle (DQ(n)) is smaller than that of the previous scanning cycle (DQ(n–1)). The answer will be no for the time being, and so the control will proceed to step 706, where a count value C is reset to zero, and then the control proceeds to stet 707, where the target overall slip ratio Rsall obtained in step 50 is entered for a target inside slip ratio Rsrib for a rear wheel at the inside of the turn (in fact, twice as much as the target slip ratio applied to one of the rear wheels at the inside of the turn, as will be noted in the following descriptions). Then the control proceeds to step 712 for further processes of the drift-out control based upon the target overall slip ratio Rsall, as will be described hereinunder.

When such a drift-out control has been carried out for a while, the drift-out quantity DQ representing the liability of the vehicle body to drift out will reach its peak point and then start to decrease. Then this is detected by step 702, and the control pass is switched over to step 703. Steps 703 and 704 are provided to take an appropriate delay time before starting the trimming control for the braking of the rear wheel at the inside of the turn, constructing the essential part of the present invention. By providing steps 703 and 704 for taking a delay time from the peak point, the general performance of trimming the target slip ratio of the rear wheel at the inside of turn is made more flexible by a variable combination of the starting time point and the sloping angle of reduction of the target slip ratio. If such a delay time desired is very small, steps 703 and 704 will be practically omitted. In any event, when the control reaches step 705, flag Fb is set to 1 so that steps 702–705 are detoured thereafter, and then, the calculation of Rsrib is now made either in the manner described with reference to step 710 or the manner described with reference to step 711, according to whether the answer of step 709 is yes or no, i.e. whether a monotonous decrease of the drift-out quantity DQ continues or is partially interrupted.

Figure 6:
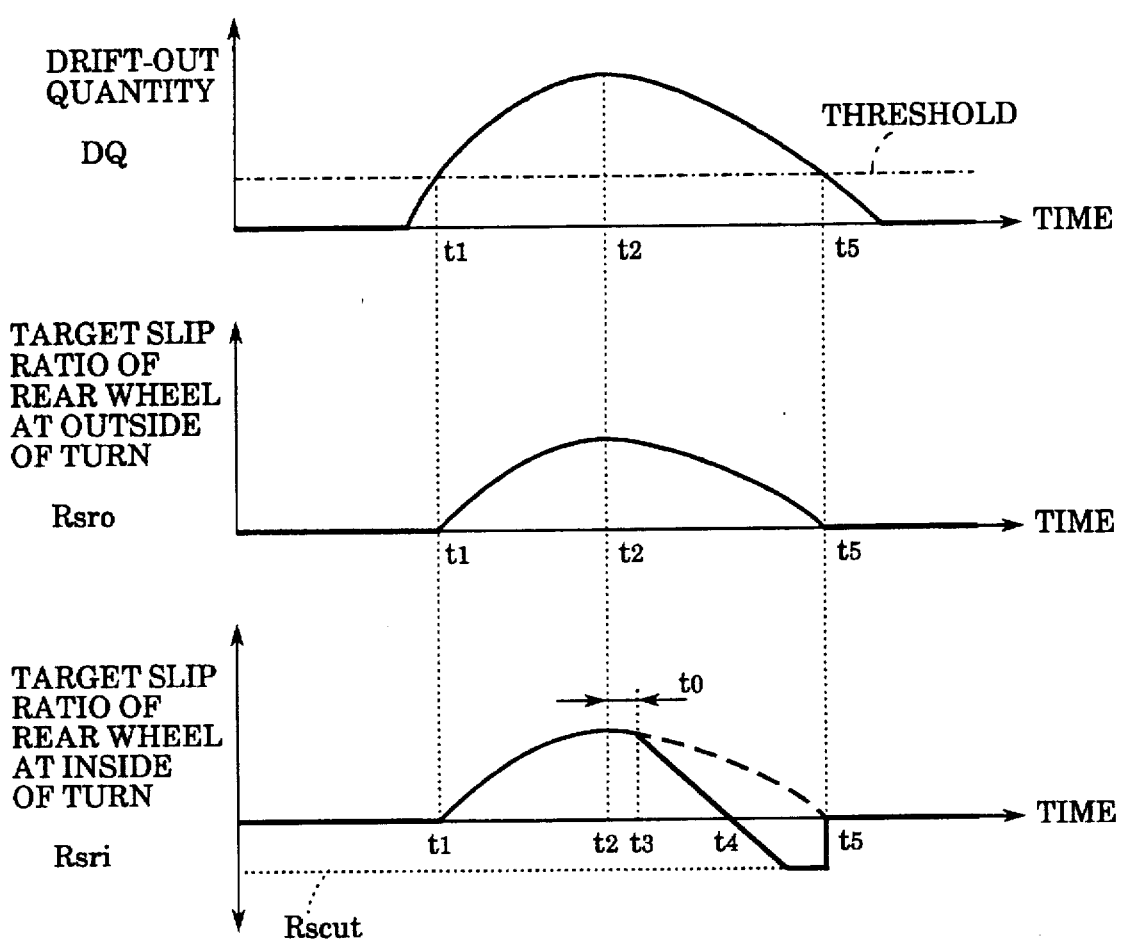
FIG. 6 is a set of graphs showing an example of the performance of the target slip ratios of the rear wheels at the outside and the inside of the turn.

The control according to the present invention is illustrated in FIG. 6, wherein the graph of the top rank shows an example of how the drift-out quantity DQ increases, so as to traverse a threshold value for triggering the drift-out control at time point t1, when a vehicle is driven through a curved course. When the drift-out quantity DQ increases beyond the threshold value, target slip ratios Rsro and Rsri for the rear wheels at the outside and inside of the turn are calculated to increase altogether in the same manner as shown in the second and the third ranks of FIG. 6, to be substantially proportional to the magnitude of the drift-out quantity, until the drift-out quantity reaches, at time point t2, a peak point of its convex performance curve.

Until this time point t2, or time point t3 delayed therefrom by a delay time to corresponding to the time count Co by steps 703 and 704, the target slip ratios Rsro and Rsri for the rear wheels at the outside and inside of the turn calculated in step 712 as Rsro=Rsall/2 and Rsri=Rsrib/2, respectively, are, in fact, the same as one another.

However, after the control has passed the time point t2 (or t3), when the drift-out quantity is monotonously decreasing, Rsrib, i.e. a twice value of the target slip ratio for the rear wheel at the inside of the turn, is calculated in step 710 according to the following formula 5:

$$Rsrib = MED[Rsrib-Rodn, Rsall, Rscut] \quad (5)$$

The above formula means that the value of Rsrib is made to the value of a medium magnitude term of Rsrib-Rodn, Rsall and Rscut. Rodn may be a value such as e.g. 0.4% of Rsall, and Rscut may be a value such as e.g. −18% of Rsall. Therefore, the formula 5 means that Rsrib is decreased from the value of Rsall at such a rate as 0.4% of Rsall by each scanning cycle, i.e. tens of micro-seconds, while the decrease of Rsrib is limited to a value such as −0.18*Rsall.

During such a generally decreasing process of the drift-out quantity DQ, if the drift-out quantity DQ increases temporarily for a while, the control process is diverted to step 711, wherein Rsrib is calculated according to the following formula 6, so that Rsrib is temporarily increased (Roup may also be of the order of 0.4% of Rsall.):

$$Rsrib = MED[Rsrib+Roup, Rsall, Rscut] \quad (6)$$

An example of such a trimming process by the above formula 5 for the target slip ratio of the rear wheel at the inside of the turn toward the end of the drift-out control is shown in the graph of the third rank of FIG. 6, in contrast to the prior art that the target slip ratio of the rear wheel at the inside of the turn is controlled to have the same performance as that of the rear wheel at the outside of the turn with a substantially constant distribution ratio. As shown in the graph, the share of the target slip ratio of the rear wheel at the inside of the turn is modified from the performance shown by a broken line to that shown by a solid line in a final stage of the drift-out control extending between time points t3 and t5, to be progressively lesser relative to that of the target slip ratio for the rear wheel at the outside of the turn, turning into a negative region at time point t4 in the shown embodiment. The negative value of slip ratio Rsri (=Rsrib/2) by braking is not always entirely meaningless, because the slip ratio Rsri is used, as described hereinbelow, to calculate a slip rate of the rear wheel at the inside of the turn based upon a standard wheel speed for which the wheel speed of the front wheel at the inside of the turn is generally adopted, and therefore, if the front wheel at the inside of the turn is also being braked in the meantime, the slip rate of the rear wheel at the inside of the turn can be calculated as a positive value. Further, if the rear wheels are being driven by engine in the meantime, the slip rate of the rear wheel at the inside of the turn can be calculated as a positive value. In any event, by appropriately determining the magnitude of Rodn and Roup with t0, the trimming performance of the target slip ratio of the rear wheel at the inside of the turn from Rsall to Rsrib is appropriately adjusted so that the termination performance of the drift-out control is improved not to cause any abrupt sliding out of the rear wheels in the final stage of the control.

In step 713, according to the direction of turn of the vehicle judged from the sign of the yaw rate γ, the rear wheels at the outside and the inside of the turn are determined. When the vehicle is making a left turn, the target slip ratios Rsrl and Rsrr for the rear left and rear right wheels are determined according to the following formulae 7, whereas when the vehicle is making a right turn, the target slip ratios Rsrl and Rsrr of the rear left and rear right wheels are determined according to the following formulae 8:

$$Rsrl = Rsri \quad Rsrr = Rsro \quad (7)$$

$$Rsrl = Rsro \quad Rsrr = Rsri \quad (8)$$

Then, returning to FIG. 2, in step 80, the braking forces applied to the rear left and rear right wheels are controlled according to the steps shown in more detail in FIG. 4, so that the slip rates of the rear left and rear right wheels conform to the respective target slip rates.

Referring to FIG. 4, in step 81, target wheel speeds Vwti (i=rl, rr) of the rear left and rear right wheels are calculated, based upon a reference vehicle speed Vb such as that of a front wheel at the inside of the turn, according to the following formula 9:

$$Vwti = Vb*(100-Rsri)/100 \quad (9)$$

In step 82, taking Vwid as wheel acceleration of each wheel (differentiation of Vwi) and Ks as an appropriate positive constant, slip rates SPi (i=rl, rr) of the rear left and rear right wheels are calculated according to the following formula 10:

$$SPi = Vwi - Vwti + Ks*(Vwid-Gx) \quad (10)$$

In step 83, the control valves 28 and 44 are each changed Over to its second position so that the passage 30 is supplied with the accumulator pressure.

In step 84, it is judged if SPi is greater than an appropriate positive threshold value SPop which may be a relatively small value, and if the answer is yes, the control proceeds to step 85, where the on-off valves 60RL, 62RL, 60RR, 62RR are controlled to increase the hydraulic pressure supplied to the wheel cylinders 64RL and 64RR, so as to newly apply a braking force to the rear wheels or to more increase the braking force already applied to the rear wheels, as a positive value of SPi means that the wheel speed Vwi must be decreased to conform to its target value Vwti.

When the answer of step 84 is no, then in step 86 it is judged if SPi is smaller than a relatively small negative threshold value SPon, i.e., if SPi is a negative value whose absolute value is greater than a relatively small absolute value of SPon, and if the answer is yes, the control proceeds to step 87, where the on-off valves 60RL, 62RL, 60RR, 62RR are controlled to decrease the hydraulic pressure supplied to the wheel cylinders 64RL and 64RR, so as to decrease the braking force already applied to the rear wheels.

When the answer of step 86 is no, the control proceeds to step 88, where the on-off valves 60RL, 62RL, 60RR, 62RR are all kept in the closed condition to hold the pressures of the wheel cylinders 64RL and 64RR unchanged.

Although the present invention has been described in detail with respect to a particular embodiment thereof, it will be apparent for those skilled in the art that various modifications are possible with respect to the shown embodiment without departing from the spirit of the present invention.

We claim:

1. A drift-out suppress control device of a vehicle having a vehicle body, and front left, front right, rear left and rear right wheels, comprising:

a means for estimating a liability of the vehicle body to drift out for producing a drift-out quantity which generally increases along with increase of the drift-out liability;

a brake means for selectively applying a variable braking force to each of said wheels; and a control means for controlling said brake means according to said drift-out quantity so as variably to apply a braking force to said rear left and rear right wheels with a target value therefor for suppressing the vehicle body against drifting out, said target value being generally proportional to said drift-out quantity and being divided between said rear left and rear right wheels according to a distribution ratio, wherein said control means decreases a share of said distribution ratio for one of said rear left and rear right wheels serving at the inside of a turn to be progressively lesser relative to a share of said distribution ratio for the other of said rear left and rear right wheels serving at the outside of the turn as the drift-out control approaches the end thereof.

2. A drift-out suppress control device according to claim 1, wherein said control means includes a means for detecting a peak point of increase of said drift-out quantity, and starts a progressive reduction of said share of distribution ratio for the rear wheel at the inside of the turn relative to said share of distribution ratio for the rear wheel at the outside of the turn at the detection of said peak point.

3. A drift-out suppress control device according to claim 2, wherein said control means further includes a means for taking a delay time from the detection of said peak point, and starts said progressive reduction of said share of distribution ratio for the rear wheel at the inside of the turn relative to said share of distribution ratio for the rear wheel at the outside of the turn after the lapse of said delay time from the detection of said peak point.

* * * * *